United States Patent
Paulraj et al.

(10) Patent No.: US 12,229,273 B2
(45) Date of Patent: Feb. 18, 2025

(54) SOFTWARE DEFINED STORAGE AWARE HARDWARE ACCELERATED NVME INITIATOR SERVICE

(71) Applicant: DELL PRODUCTS L.P., Round Rock, TX (US)

(72) Inventors: Deepaganesh Paulraj, Bangalore (IN); Ankit Singh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 113 days.

(21) Appl. No.: 18/306,633

(22) Filed: Apr. 25, 2023

(65) Prior Publication Data

US 2024/0362334 A1    Oct. 31, 2024

(51) Int. Cl.
*G06F 21/57*    (2013.01)
*G06F 8/71*     (2018.01)
*G06F 21/44*    (2013.01)

(52) U.S. Cl.
CPC .............. *G06F 21/575* (2013.01); *G06F 8/71* (2013.01); *G06F 21/44* (2013.01); *G06F 2221/034* (2013.01)

(58) Field of Classification Search
CPC .......... G06F 21/575; G06F 21/44; G06F 8/71; G06F 2221/034
See application file for complete search history.

(56) References Cited

U.S. PATENT DOCUMENTS

| 11,514,165 | B2 | 11/2022 | Tonry et al. | |
| 2015/0193620 | A1* | 7/2015 | Khatri | G06F 21/575 713/2 |
| 2016/0378970 | A1* | 12/2016 | Campbell | G06F 21/575 726/17 |
| 2018/0276387 | A1* | 9/2018 | Liu | G06F 21/575 |
| 2020/0089888 | A1 | 3/2020 | Kelly et al. | |
| 2020/0250314 | A1 | 8/2020 | Vidyadhara et al. | |
| 2021/0232691 | A1* | 7/2021 | Bishop | H04L 9/3236 |
| 2023/0027315 | A1* | 1/2023 | Liu | G06F 11/2284 |
| 2024/0086170 | A1* | 3/2024 | Tsukiashi | G06F 8/71 |

* cited by examiner

*Primary Examiner* — Glenn A. Auve
(74) *Attorney, Agent, or Firm* — Larson Newman, LLP

(57) ABSTRACT

An information handling system detects installation of a hardware device that includes software, and transmits a request for a secure boot certificate associated with a hardware identifier of the hardware device and a software version of the software to a remote secure boot service. The secure boot service which maintains a centralized secure boot certificate store queries for the secure boot certificate based on the request and transmits the secure boot certificate to the information handling system. The secure boot service also performs a refinement mapping of the secure boot certificates in the store. Subsequent to receiving the secure boot certificate, the system provisions the secure boot certificate.

20 Claims, 11 Drawing Sheets

SOFTWARE DEFINED STORAGE AWARE HARDWARE ACCELERATED NVME INITIATOR SERVICE

FIELD OF THE DISCLOSURE

The present disclosure generally relates to information handling systems, and more particularly relates to automatic provisioning of secure boot certificates.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system detects installation of a hardware device that includes software, and transmits a request for a secure boot certificate associated with a hardware identifier of the hardware device and a software version of the software. Subsequent to receiving the secure boot certificate, the system provisions the secure boot certificate.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
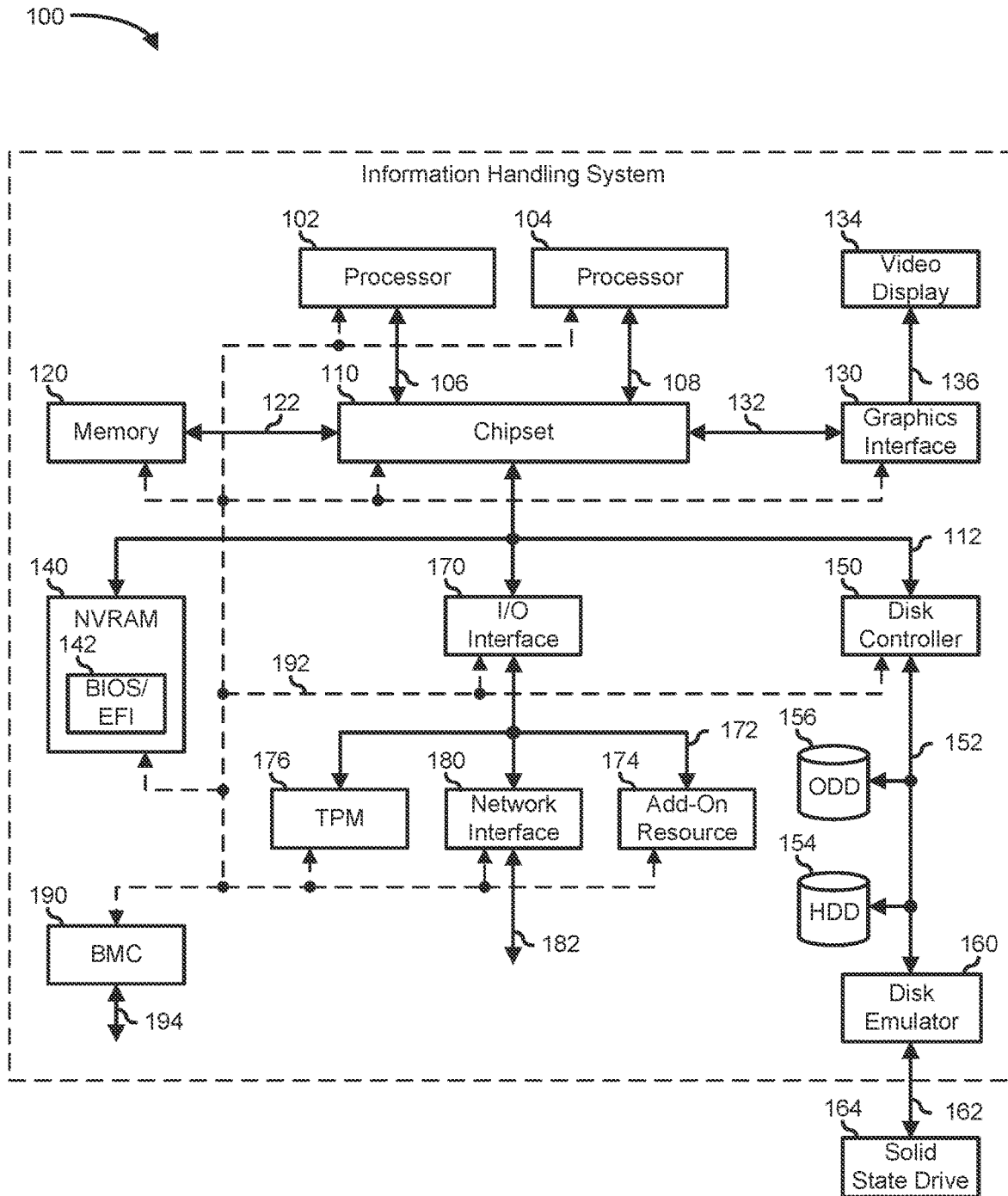
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board, or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell R Remote Access Controller (iDRAC).

Management interface 192 represents one or more out-of-band communication interfaces between BMC 190 and the elements of information handling system 100, and can include an $I^2C$ bus, a System Management Bus (SMBus), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, $I^2C$ and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure, information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Secure boot is used to securely boot an operating system by authenticating each driver, firmware, option-ROM, and boot loader before the boot loader hands control over to the operating system. The secure boot can also be used to validate new firmware images before they are loaded. To accomplish these tasks, when a new hardware device is inserted in the information handling system an associated secure boot certificate, and a hash key, may also be updated into a secure boot database. This allows the software of the device to be loaded when the secure boot is turned on. When the software is installed or updated, a previous secure boot certificate may no longer be valid. So with a new secure boot certificate, the hash key may also be updated in the secure boot database so that the firmware can be loaded when the secure boot is turned on. To update the new secure boot certificate, an information technology (IT) administrator typically manually configures the new secure boot certificate. The IT administrator also may manually generate the firmware and/or driver hash key and upload the new secure boot certificate and the firmware and/or driver hash key to the secure boot database. These processes become tedious each time a new device is added and firmware or a driver needs to be updated by the IT administrator for hundreds of servers in a data center. To address these and other needs, the present disclosure provides a system and method to automatically provision the secure boot certificate on a new device. The automatic provisioning may also be performed during driver re-installation and firmware update.

Figure 2:
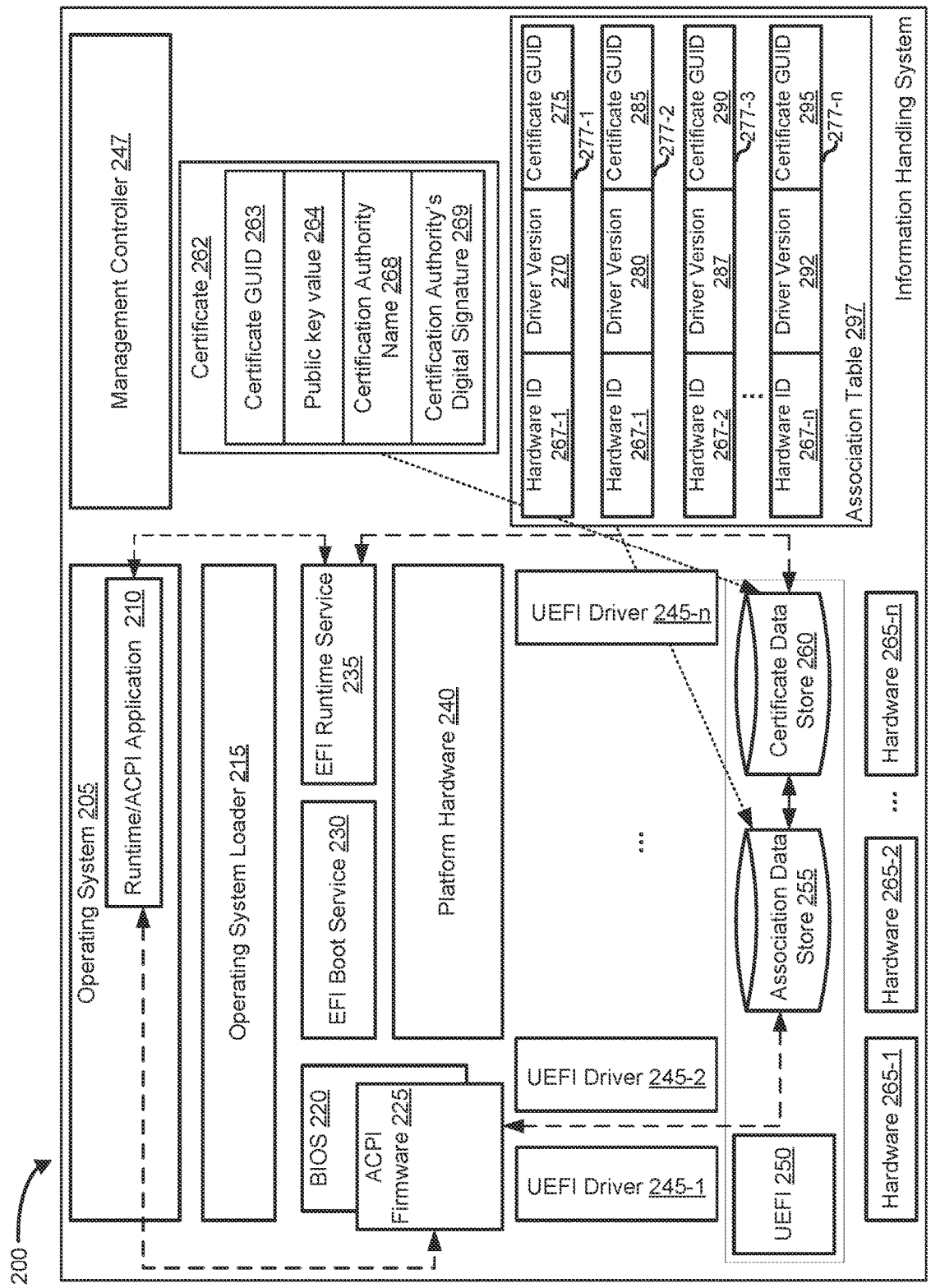
FIG. 2 is a block diagram illustrating an information handling system for automatic provisioning of secure boot certificates, according to an embodiment of the present disclosure.

FIG. 2 illustrates an information handling system 200 for the automatic provisioning of secure boot certificates and/or secure boot digests. Information handling system 200 includes an operating system 205, an operating system loader 215, a BIOS 220, an advanced configuration and power interface (ACPI) firmware 225, an EFI boot service 230, an EFI runtime service 235, a platform hardware 240, drivers 245-1 through 245-n, a management controller 247, a unified extensible firmware interface (UEFI) 250, an association data store 255, a certificate data store 260, and hardware 265-1 through 265-n. Association data store 255 may be used to store association information also referred to as tagging information into an association database or another organized structure for data. For example, association data store 255 may be used to store an association table 297. Certificate data store 260 may be used to store a secure boot digest and/or a secure boot certificate, such as a certificate 262 in a secure boot database or another organized structure for data.

Operating system 205 includes a runtime/ACPI application 210 that may be configured to communicatively interface with ACPI firmware 225 and EFI runtime service 235 for automatically provisioning a secure boot certificate, such as certificate 262. Certificate 262 may be a secure boot certificate and includes identifying information, such as GUID 263. Certificate 262 may also include a public key value 264, a certification authority name 268, and a certification authority's digital signature 269. Certificate 262 may also include a digital signature from a remote secure boot service. Public key value 264 may be used to validate certificate 262.

Certificate ACPI firmware may be configured to communicatively interface with association data store 255 and/or certificate data store 260. EFI runtime services may be configured to communicatively interface with certificate data store 260 and/or association data store 255. Runtime/ACPI application 210 may also be configured to generate an association tag and transmit association information to a remote service and other functions as detailed below. In another embodiment, management controller 247 may be configured to communicatively interface with aforementioned components and execute functions that are performed by runtime/ACPI application 210.

Management controller 247, which is similar to BMC 190 of FIG. 1, may include a microprocessor, microcontroller, digital signal processor DSP, application-specific integrated circuit (ASIC), field programmable gate array (FPGA), electrically erasable programmable read-only memory EEPROM, or any combination thereof. In certain embodiments, management controller 112 may include or may be an integral part of a baseboard management controller (BMC), a remote access controller (e.g., a Dell Remote Access Controller or Integrated Dell Remote Access Controller), or an enclosure controller. In other embodiments, management controller 247 may include or may be an integral part of a chassis management controller (CMC).

BIOS 220, which is similar to BIOS/EFI 142 of FIG. 1, may communicatively interface with EFI boot service 230. EFI boot service 230 includes functions that may be used in a UEFI environment before operating system 205 is loaded by operating system loader 215. EFI runtime service 235 may be used to abstract various parts of the hardware implementation of platform hardware 240 from operating system 205. Functions of EFI runtime service 235 may be available before and after the loading of operating system 205. UEFI 250 may be configured to provide an interface to association data store 255 and certificate data store 260, such as when storing and/or retrieving a secure boot certificate, secure boot digest, and/or other information. Association data store 255 and certificate data store 260 may be a non-volatile storage device that supplies data storage services to components of an information handling system, such as a firmware storage device, an NV-RAM, a flash device, a hard disk, solid state disk, and/or any computer-readable medium operable to store data.

Hardware 265-1 through 265-n, also referred to as a hardware device or simply as a device, may be similar to add-on-resource 174 of FIG. 1. Hardware 265 may be an integrated circuit (such as an ASIC, an FPGA, a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, an SoC, or a stand-alone device). One or more of hardware 265 may have been installed by a user, such as an IT administrator.

Each one of hardware 265 can include software, including firmware embedded in a processor or software capable of operating a relevant environment of the information handling system. In particular, each one of hardware 265 may include software such as a driver, a UEFI firmware, also referred to simply as firmware. For example, each one of hardware 265-1 through 265-n may include a firmware, such as one of UEFI firmware 245-1 through UEFI firmware 245-n.

Association table 297 may be a key/value pair table that maintains an association mapping between a certificate's globally unique identifier (GUID), a hardware identifier, and a software version. The hardware identifier may be used by operating system 205, runtime/ACPI application 210, and/or management controller 247 to match a hardware device to a driver package or a software version for the hardware device. In addition, the hardware identifier may identify the hardware device's type, vendor, etc. The software version includes a firmware version or a driver version for the hardware device. The association mapping at association table 297 may be updated when a new hardware device is installed in information handling system 200. The association mapping may also be updated when the software of the hardware device is updated, such as with a new software version. One of skill in the art can appreciate that instead of a key/value pair table, the association tags may be stored in other data structures, such as in a hash data structure.

An association tag, such as association tags 277-1 through 277-n, may be used to uniquely identify an association mapping. In this example, hardware identifier 267-1 may have been associated with a driver version 270 and a certificate GUID 275. This association mapping may be uniquely identified via association tag 277-1. As such association tag 277 represent an association between a hardware identifier and a software version with a secure boot certificate and/or digest. Driver version 270 may have been updated to a driver version 280. Accordingly, the association mapping related to hardware identifier 267-1 may be updated, generating association tag 277-2, which shows the association between hardware identifier 267-1, driver version 280, and a certificate GUID 285. Association tag 277-3 may identify an association of hardware identifier 267-2, a driver version 287, with a certificate GUID 290. Hardware identifier 267-n and driver version 292 are mapped with a certificate GUID 295. Although the association tags shown herein include certificate GUIDs, the association tags may include a hash key, also referred to as a secure boot digest instead of the secure boot certificate GUIDs. In addition, although the association tags shown in this example include driver versions, a software version or a firmware version may be used instead. An association tag maintains the association between a certificate GUID/secure digest, a hardware identifier, and a software version so that when the software associated with the hardware device is reinstalled or updated, the respective association tag may also be updated. The association tag may also be updated when the hardware device is re-installed.

In another embodiment, a new association tag may be generated for the hardware identifier mapping to the updated software version. The association information, which includes the association mapping between the certificates GUID, hardware identifier, and software version, may be transmitted by runtime/ACPI application 210 or management controller 247 to a remote secure boot service. The secure boot service may be configured to maintain and/or manage a superset table of an aggregation of the association tags from various management controllers. The secure boot service can return a secure boot certificate based on the hardware identifier and/or software version included in a request. The superset table may also allow the secure boot service to perform progressive refinement mapping by superimposing a group association tag with a partial 1:1 association tag. A group association tag may include a plurality of hardware identifiers and software versions to a plurality of certificate GUIDs or secure boot digests.

Figure 3:
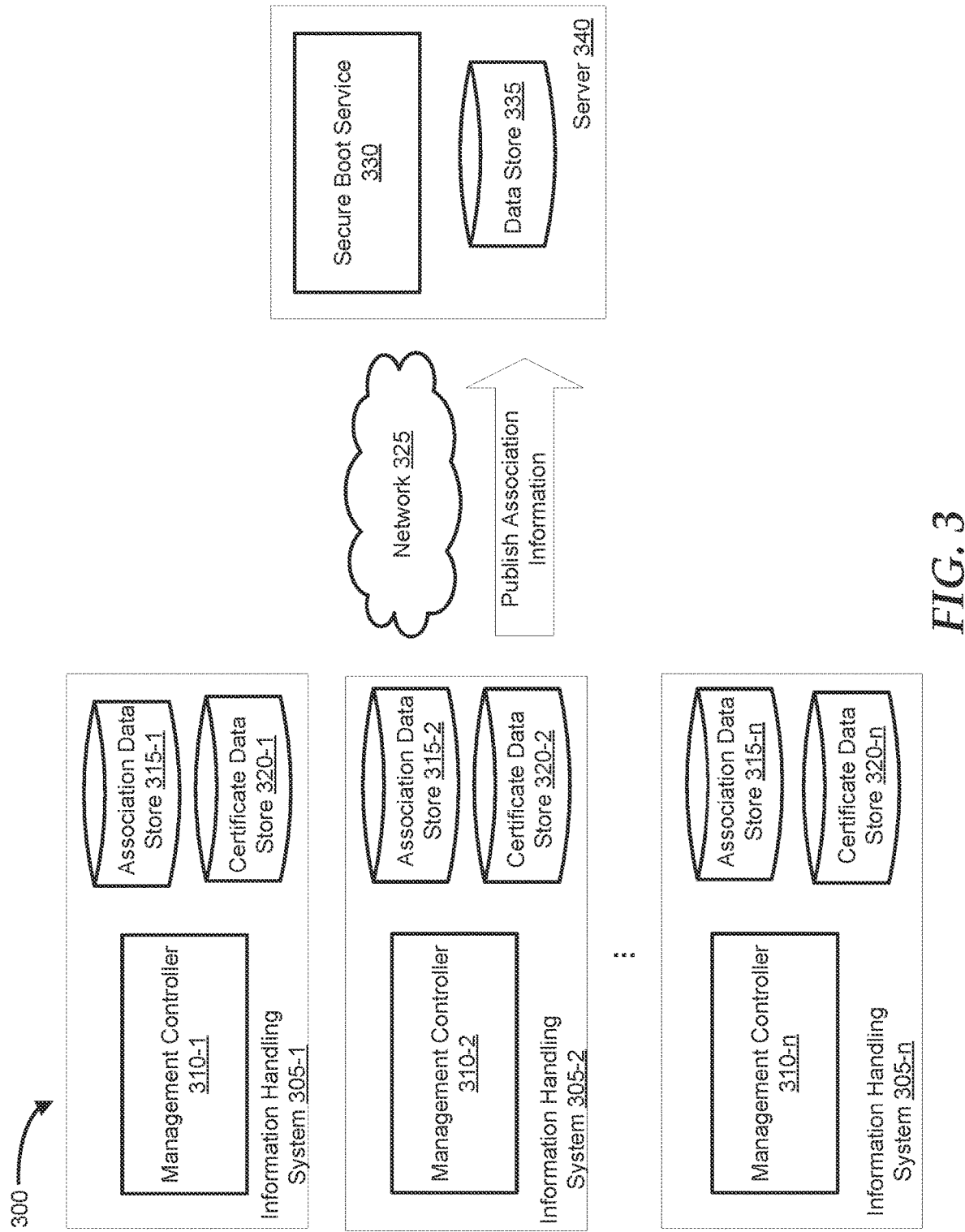
FIG. 3 is a block diagram illustrating an environment for automatic provisioning of secure boot certificates, according to an embodiment of the present disclosure.

FIG. 3 shows an environment 300 for automatic provisioning of secure boot certificates. Environment 300 includes servers 305-1 through 305-n, a network 325, and a server 340. Each of information handling systems 305 includes a management controller 310, an association data store 315, and a certificate data store 320. For example, information handling system 305-1 includes a management controller 310-1, association data store 315-1, and certificate data store 320-1. Information handling system 305-2 includes a management controller 310-2, association data store 315-2, and certificate data store 320-2. Server 340 includes a secure boot service 330 and a data store 335. Management controller 310 is similar to management controller 247 of FIG. 1. Association data store 315 is similar to association data store 255 of FIG. 1, wherein association data store 315 may store association information similar to association table 297 of FIG. 2. Certificate data store 320 is similar to certificate data store 260 if FIG. 1, wherein certificate data store 320 may store secure boot certificates and/or secure boot digests.

Network 325 may be implemented as or may be a part of, a storage area network (SAN), a personal area network (PAN), a local area network (LAN), a metropolitan area network (MAN), a wide area network (WAN), a wireless local area network (WLAN), a virtual private network (VPN), an intranet, the Internet, or any other appropriate architecture or system that facilitates the communication of signals, data and/or messages. Network 325 may transmit data using any storage and/or communication protocol, including without limitation, Fibre Channel, Frame Relay, Asynchronous Transfer Mode (ATM), Internet Protocol (IP), other packet-based protocol, small computer system interface (SCSI), Internet SCSI (iSCSI), Serial Attached SCSI (SAS), or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 325 and its various components may be implemented using hardware, software, or any combination thereof.

Server 340 may be a remote server, which is similar to information handling system 100 of FIG. 1. Server 340 may include one or more of a computing device, a corporate server, a repository server, a configuration application server, a virtual machine (such as VMware® virtual machine), or any suitable information handling system. In particular embodiments, server 340 may include one or more servers or functions of one or more servers. Server 340 includes secure boot service 330 which may be a remote centralized secure boot service in the cloud that may be accessible via network 325. Secure boot service 330 may be associated with data store 335, wherein secure boot service 330 can store association information received from management controllers 310. A client device, such as information handling system 305 may access software resources provided by a server 340 like secure boot service 330, data store 335, or any other suitable data, applications, or images. In particular embodiments, information handling system 305 may access resources provided by server 340 only after providing suitable authentication information. Alternatively, server 340 may provide software or other resources automatically to information handling systems 305.

Each one of management controllers 310 may publish association information to secure boot service 330 via network 325. The association information may include a set of association mappings between the certificate GUIDs, the hardware identifiers, and the firmware/hardware versions, also referred to herein simply as association mappings. Secure boot service 330 may maintain a superset of the association mappings received from management controllers 310. For example, secure boot service 330 may maintain an association table that includes association tables from various information handling systems.

Secure boot service 330 may update the superset of the association mappings whenever it receives a set of association mappings from one of management controllers 310. For example, management controller 310-1 may transmit association information that includes a set of association mappings to secure boot service 330. Management controller 310-2 may publish another set of association mappings to secure boot service 330. The set of association mappings may be added to the superset of the association mappings maintained by the secure boot service that is stored in data store 335. The superset of association mappings may be maintained using an association table similar to association table 297 of FIG. 2 or other data structures such as a hash. Secure boot service 330 may also maintain unique association mappings and discard duplicates. For example, if secure boot service 330 determines that the association mapping received is a duplicate of one stored in data store 335, then secure boot service 330 may discard the received association mapping. Secure boot service 330 may also perform a refinement process on the received association mapping and determine whether a subset is a duplicate association mapping, and then discard the duplicate.

Accordingly, instead of an administrator manually uploading secure boot certificates and generating hash keys when installing hardware or performing firmware updates, a management controller may request secure boot service 330 for a secure boot certificate associated with the hardware and firmware/driver version pair automatically. Secure boot service 330 may determine whether the secure boot certificate is stored in data store 335 and if so, respond to the request, wherein the response includes the secure boot certificate. Having the superset of the association mapping in data store 335 allows secure boot service 330 to perform a refinement of the association mappings by superimposing the group tagging with the partial 1:1 association tag and splitting the group tagging into an individual 1:1 association tag as discussed in FIG. 11.

Figure 4:
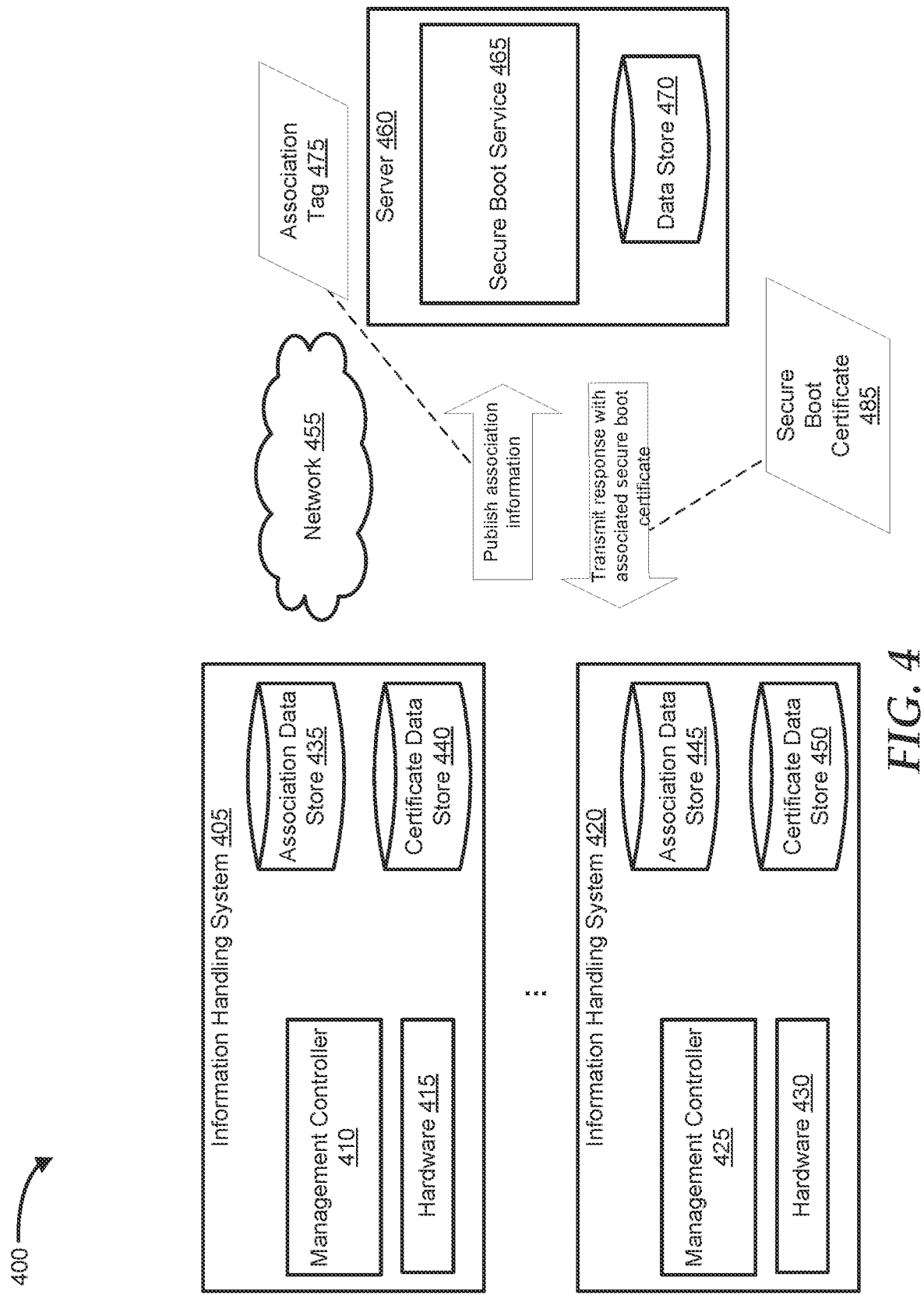
FIG. 4 is a block diagram illustrating an environment for automatic provisioning of secure boot certificates, according to an embodiment of the present disclosure.

FIG. 4 shows an environment 400 for automatic provisioning of secure boot certificates. Environment 400 includes an information handling system 405, an information handling system 420, a network 455, and a server 460. Information handling system 405 includes a management controller 410, a hardware 415, an association data store 435, and a certificate data store 440. Information handling system 420 includes a management controller 425, a hardware 430, an association data store 445, and a certificate data store 450. Server 460 includes a secure boot service 465 and a data store 470. Information handling system 405, information handling system 420, and server 460 are similar to information handling system 100 of FIG. 1. In addition, information handling systems 405 and 420 are similar to information handling system 200 of FIG. 2.

When hardware 415 is installed in information handling system 405, which may be the first time that a hardware device of such device type is installed in environment 400, an IT administrator may generate a secure boot certificate. The IT administrator may also generate a secure boot digest which may be a cryptographic hash key calculated over a firmware/driver version of hardware 415. The secure boot certificate may include a public portion of the secure boot digest and other information associated with hardware 415. The secure boot digest may be used to verify that a firmware/driver of a device has not been changed. As such, the secure boot digest may also be updated when the firmware/driver is updated. The secure boot digest may be generated using one of the various encryption algorithms like a secure hash algorithm, advanced encryption standard, or similar.

Management controller 410 may create an association tag against a secure boot certificate GUID along with a hardware identifier and a firmware/driver version of the firmware or driver installed in hardware 415. The certificate GUID may be associated with the certificate and/or secure digest associated with hardware 415. Management controller 410 may forward the association information which includes the association tag and the secure boot certificate or the secure digest to secure boot service 465 via network 455. Secure boot service 465 may be a centralized secure boot service for management controllers in environment 400, such as management controllers 410 and 425.

Similarly, when the driver or firmware in hardware 415 is upgraded, the IT administrator may generate a new secure boot digest associated with the upgraded driver or firmware. The IT administrator may upload the new secure boot certificate and/or the new secure boot digest through a BIOS or management controller 410 of information handling system 405. Management controller 410 may update and/or generate a new association tag against the new secure boot certificate and/or the new secure boot digest. Management controller 410 may also update a device hardware identifier associated with hardware 415 and the new firmware/driver version. Management controller 410 may forward the association information that includes the new or updated association tag, such as association tag 475 which includes the new secure boot certificate and/or new secure digest to secure boot service 465 via network 455.

When hardware 430 which is similar to hardware 415 is inserted in information handling system 420, management controller 425, may query secure boot service 465 for the secure boot certificate and/or secure digest associated with the device type of hardware 430. A hardware device may be similar to another hardware device when both devices are of the same device type. Hardware 430 may be similar to hardware 415 when both hardware devices are of the same hardware device type. Secure boot service 454 may transmit a response that includes the secure boot certificate 485 and/or the secure boot digest.

Management controller 425 may update association data store 445 with the received secure boot certificate 485 and/or secure boot digest. During the update, management controller 425 may create an association tag that associates hardware 430 and firmware/hardware version with the secure boot certificate and/or secure boot digest. Management controller 425 may store the association information that includes the association tag in association data store 445. Management controller 425 may then provision and store the received secure boot certificate and/or the secure boot digest in certificate data store 450. Thus, the IT administrator of the server may not generate a secure boot certificate and/or a secure digest when inserting a second device that is similar to a first device, wherein the first hardware device has a secure boot service and/or secure boot digest stored in data store 470 that is mapped to the first device.

Figure 5:
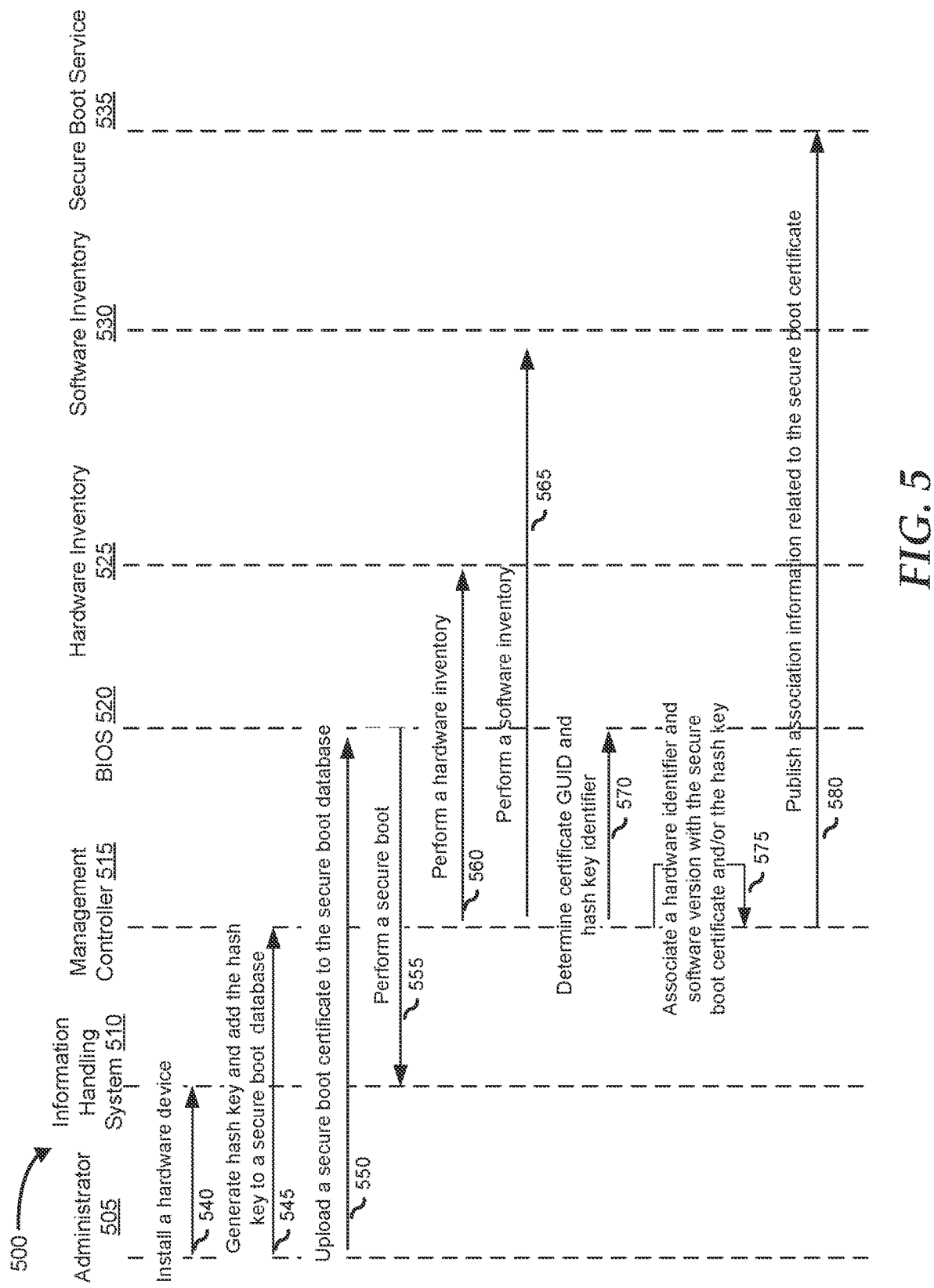
FIG. 5 is a sequence diagram for automatic provisioning of secure boot certificates, according to an embodiment of the present disclosure.

FIG. 5 shows a diagram of a sequence 500 for automatic provisioning of secure boot certificates and/or hash keys with a new hardware device installation or re-installation. Sequence 500 includes an administrator 505, an information handling system 510, a management controller 515, a BIOS 520, a hardware inventory 525, a software inventory 530, and a secure boot service 535. Information handling system 510 may be similar to information handling system 200 of FIG. 2. Management controller 515 may be similar to management controller 247 of FIG. 2. BIOS 520 may be similar to BIOS 220 of FIG. 2. While embodiments of the present disclosure are described in terms of the aforementioned components, it should be recognized that other components or systems may be utilized to perform the described workflow. One of skill in the art will appreciate that this sequence diagram explains a typical example, which can be extended to advanced applications or services in practice.

At 540, administrator 505 may install a new hardware device into information handling system 510. The administrator may also install software, which includes firmware and/or driver associated with the hardware device. At 545, administrator 505 may generate a hash key and store the hash key, also referred to herein as a secure boot digest, in a secure boot database which may be in a secure boot data store, such as certificates data store 260 of FIG. 1. At 550, administrator 505 may upload a secure boot certificate to the secure boot database, which is accessible during a secure boot process. If the secure boot process is performed before adding the hash key and the secure boot certificate to a data store associated with the secure boot process then the secure boot process may fail.

At 555, BIOS 520 may perform a secure boot process. As the secure boot certificate and the hash key have been uploaded to the secure boot database, the secure boot process may succeed. At 560, management controller 515 may determine a hardware identifier of the hardware installed at 540. To determine the hardware identifier, management controller 515 may perform hardware inventory 525 and determine a difference between the current hardware inventory and a hardware inventory before the installation of the new hardware device. At 565, management controller 515 may determine a software version of the software installed in the hardware device. To determine the software version, management controller 515 may perform software inventory 530 and determine a difference between the current software inventory and a software inventory before the installation of the software for the new hardware device.

At 570, management controller 515 may determine a secure boot certificate GUID of the secure boot certificate that was uploaded at 550. Management controller 515 may also determine a hash key identifier of the hash key generated at 545. Management controller 515 may determine the secure boot certificate GUID and/or the hash key identifier by determining differences in the secure boot certificate entries and hash key entries in the secure boot database before and after the upload of the secure boot certificate in the secure boot database. At 575, management controller 515 may associate the hardware identifier and software version with the secure boot certificate GUID or the hash key identifier. Management controller 515 may also generate an association tag to identify the association. Management controller 515 may update an association database with the association tag. At 580, the method may publish association information related to the secure boot certificate and the hash key with the hardware identifier and/or software version. Although sequence 500 shows management controller 515 performing one or more steps in the sequence diagram, a runtime/ACPI application similar to runtime/ACPI application 210 of FIG. 2 may perform the said steps.

In this example, administrator 505 installed one hardware device, if administrator 505 installed two hardware devices, administrator 505 may generate two hash keys and upload two secure boot certificates. This may lead to a group association tag similar to association tag 950 of FIG. 9, wherein two hardware identifiers and firmware versions are associated with two secure boot certificates. Accordingly, a refinement process may be performed by the secure boot service on the group association tag.

Figure 6:
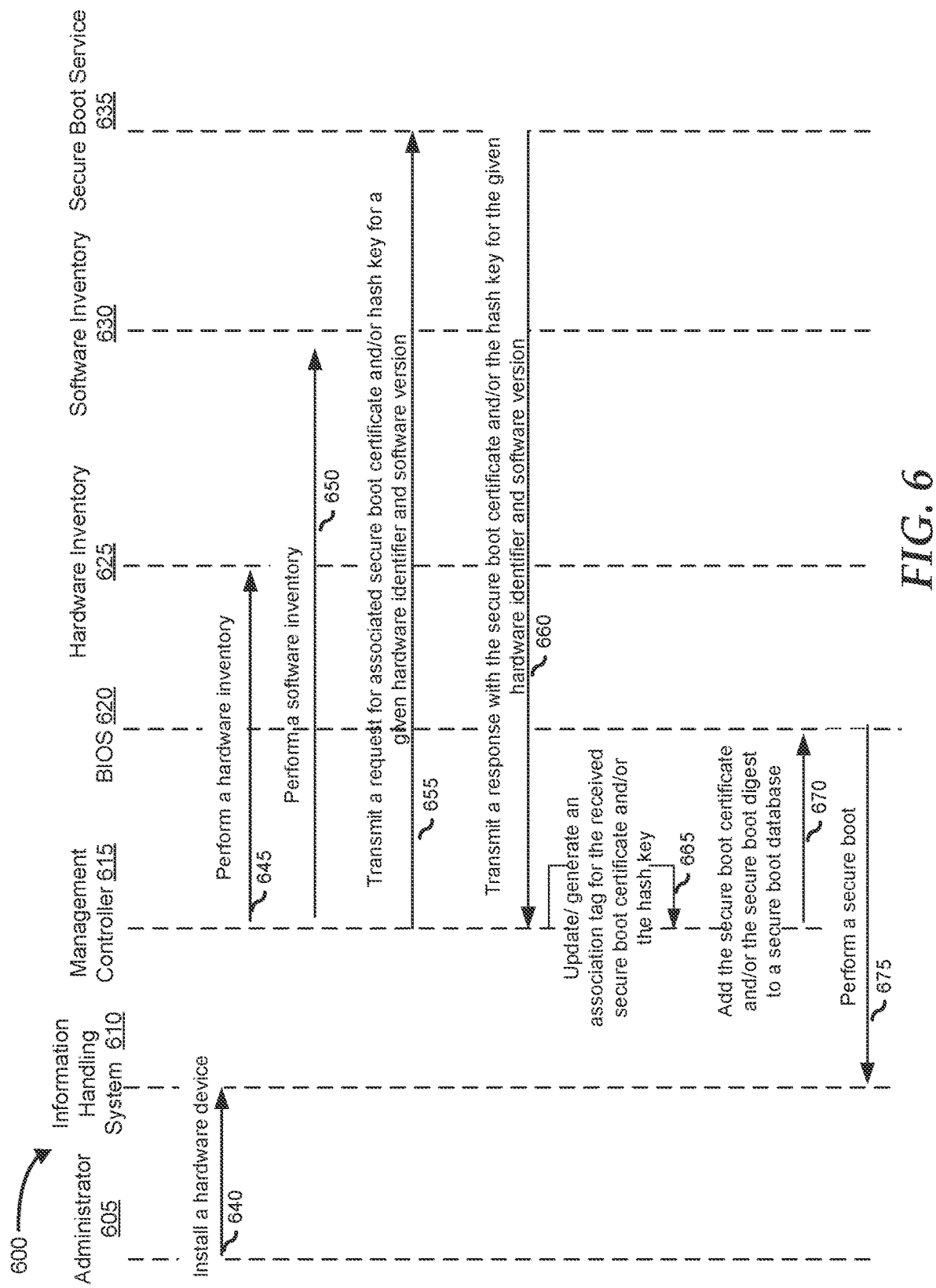
FIG. 6 is a sequence diagram for automatic provisioning of secure boot certificates, according to an embodiment of the present disclosure.

FIG. 6 shows a diagram of a sequence 600 for automatic provisioning of secure boot certificates and/or hash keys with a new hardware device installation or re-installation. Sequence 600 includes an administrator 605, an information handling system 610, a management controller 615, a BIOS 620, a hardware inventory 625, a software inventory 630, and a secure boot service 635. Information handling system 510 may be similar to information handling system 200 of FIG. 2. Management controller 515 may be similar to management controller 247 of FIG. 2. BIOS 520 may be similar to BIOS 220 of FIG. 2. While embodiments of the present disclosure are described in terms of the aforementioned components, it should be recognized that other components or systems may be utilized to perform the described workflow. One of skill in the art will appreciate that this sequence diagram explains a typical example, which can be extended to advanced applications or services in practice.

Sequence 600 typically starts at 640, where administrator 605 may install a new hardware device into information handling system 610. The new hardware device may be similar to the hardware device installed in FIG. 5. For example, the new hardware device may be of the same hardware type as the hardware device installed in FIG. 5, such as both hardware devices may be the same hardware type identifier. The new hardware device may include software installed therein. At 645, management controller 615 may determine a hardware identifier of the hardware installed at 640. To determine the hardware identifier, management controller 615 may perform hardware inventory 625 and determine a difference between the current hardware inventory and a hardware inventory before the installation of the new hardware device. At 650, management controller 615 may determine a software version of the software installed in the hardware device. To determine the software version, management controller 615 may perform software inventory 630 and determine a difference between the current software inventory and a software inventory before the installation of the software for the new hardware device.

At block 655, management controller 615 may transmit a request to secure boot service 635 for a secure boot certificate and/or a hash key that is associated with the hardware device installed in 640. Management controller 615 may transmit a hardware identifier and/or software version with the request. At 660, secure boot service 635 may transmit a response to the request. The response may include the secure boot certificate and/or the hash key associated with the hardware identifier and the software version. Secure boot service 635 may parse a table that includes a superset of association tags to determine the secure boot certificate and/or the hash key associated with the hardware identifier and the software version. If the administrator installed two hardware devices in step 540 of FIG. 2 and the secure boot service was not able to perform a refinement process with the group association tag, then secure boot service 635 may transmit both secure boot certificates at 660. However, if the secure boot service was able to perform the refinement process with the group association tag, then secure boot service 635 may transmit one of the secure boot certificates at 660.

At 665, management controller 615 may update or generate an association tag to associate the received secure boot certificate and/or the hash key to the hardware identifier and software version. At block 670, management controller 615 may add the secure boot certificate and/or the hash key to a secure boot database. Management controller 615 may also add the association tag to an association database. At block 675, management controller 615 may perform a secure boot of the information handling system. Although, sequence 600 shows management controller 615 performing one or more steps in the sequence diagram, a runtime/ACPI application similar to runtime/ACPI application 210 of FIG. 2 may perform the said steps.

Figure 7:
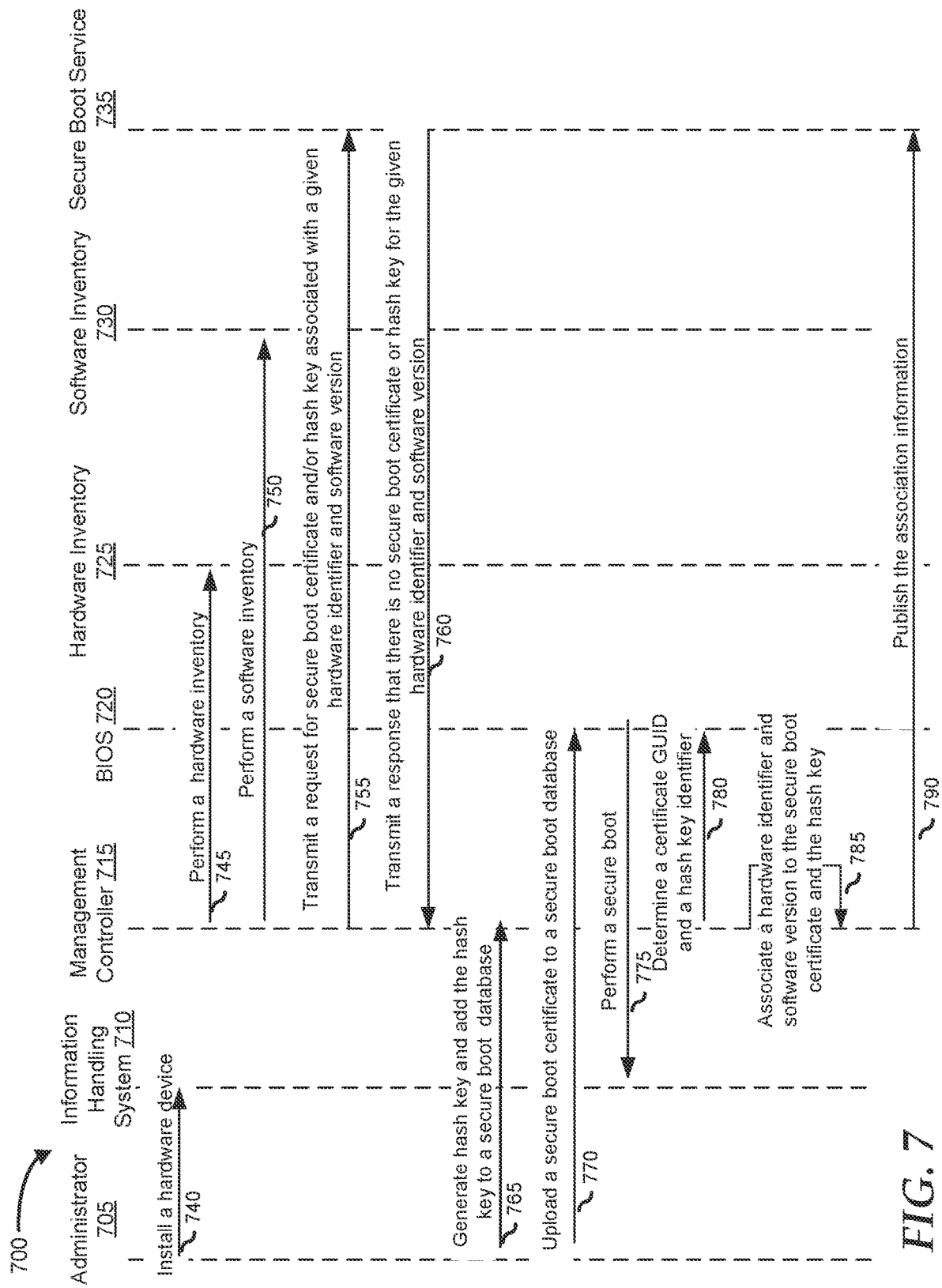
FIG. 7 is a sequence diagram for automatic provisioning of secure boot certificates, according to an embodiment of the present disclosure.

FIG. 7 shows a diagram of sequence 700 for automatic provisioning of secure boot certificates and/or hash keys with a new hardware device installation or re-installation. Sequence 700 includes an administrator 705, an information handling system 710, a management controller 715, a BIOS 720, a hardware inventory 725, a software inventory 730, and a secure boot service 735. Information handling system 710 may be similar to information handling system 200 of FIG. 2. Management controller 715 may be similar to management controller 247 of FIG. 2. BIOS 720 may be similar to BIOS 220 of FIG. 2. While embodiments of the present disclosure are described in terms of the aforementioned components, it should be recognized that other components or systems may be utilized to perform the described workflow. One of skill in the art will appreciate that this sequence diagram explains a typical example, which can be extended to advanced applications or services in practice.

At 740, administrator 705 may install a new hardware device into information handling system 710. At 745, management controller 715 may determine a hardware identifier of the hardware installed at 740. To determine the hardware identifier, management controller 715 may perform a hardware inventory and determine a difference between the current hardware inventory and hardware inventory 725 before the installation of the new hardware device. At 755, management controller 750 may determine a software version of the software installed in the hardware device. To determine the software version, management controller 715 may perform a software inventory and determine a difference between the current software inventory and software inventory 730 before the installation of the software for the new hardware device.

At block 755, management controller 715 may transmit a request to secure boot service 735 for a secure boot certificate and/or a hash key that is associated with the hardware device installed in 740. Management controller 715 may transmit a hardware identifier and/or a software version with the request. At 760, secure boot service 735 may transmit a response to the request. The response may indicate that there is no secure boot certificate and/or the hash key associated with the hardware identifier and the software version. At 765, administrator 705 may generate a hash key and store the hash key in a secure boot database. At 770, administrator 505 may upload a secure boot certificate to the secure boot database. At 775, BIOS 720 may perform a secure boot process.

At 780, management controller 715 may determine a secure boot certificate GUID of the secure boot certificate that was uploaded at 770. Management controller 715 may also determine a hash key identifier of the hash key generated at 765. Management controller 715 may determine the secure boot certificate GUID and/or the hash key identifier by determining differences in the secure boot certificate entries and hash key entries in the secure boot database before and after the upload of the secure boot certificate in the secure boot database. At 785, management controller 715 may associate the hardware identifier and software version to the secure boot certificate GUID and/or the hash key identifier. Management controller 715 may also generate an association tag to identify the association. Management controller 715 may update an association database with the association tag. At 790, the method may publish association information related to the secure boot certificate and/or the hash key with the hardware identifier and software version. Although sequence 700 shows management controller 715 performing one or more steps in the sequence diagram, a runtime/ACPI application similar to runtime/ACPI application 210 of FIG. 2 may perform the said steps.

Figure 8:
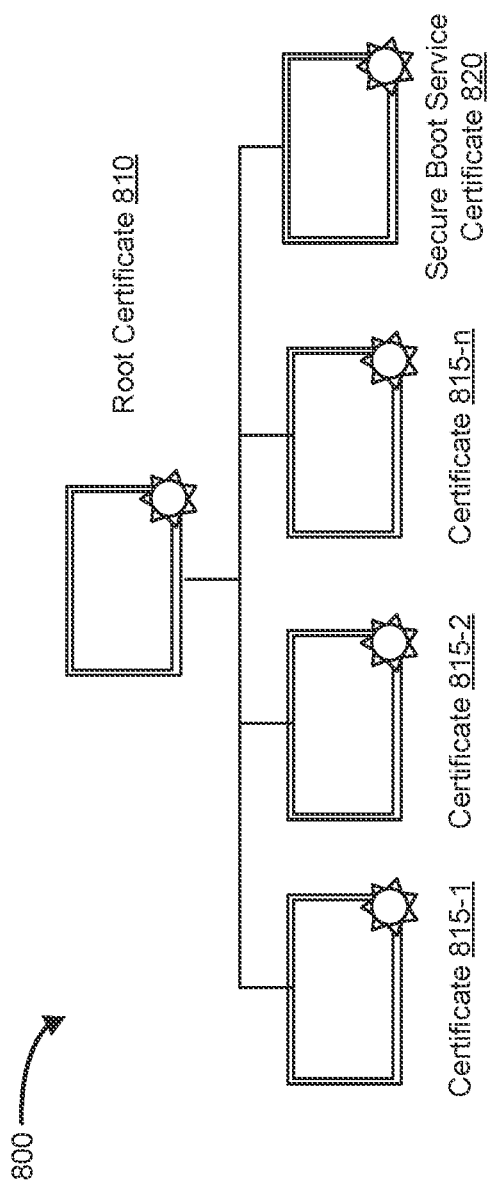
FIG. 8 is a diagram of a certificate chain of secure boot certificates, according to an embodiment of the present disclosure.

FIG. 8 shows a diagram of a certificate chain of trust 800 for hardware devices installed in an information handling system. Certificate chain of trust 800 includes a root certificate 810, certificate 815-1 through certificate 815-*n*, and a secure boot service certificate 820. Root certificate 810 may be a self-signed certificate issued by a certification authority. Certificates 815 may be certificates issued for endpoint devices while secure boot service certificate 820 may be an intermediary certificate issued by a secure boot service. The certificate authority may sign certificates 815 and secure boot service certificate 820. Secure boot service may sign certificates 815.

Figure 9:
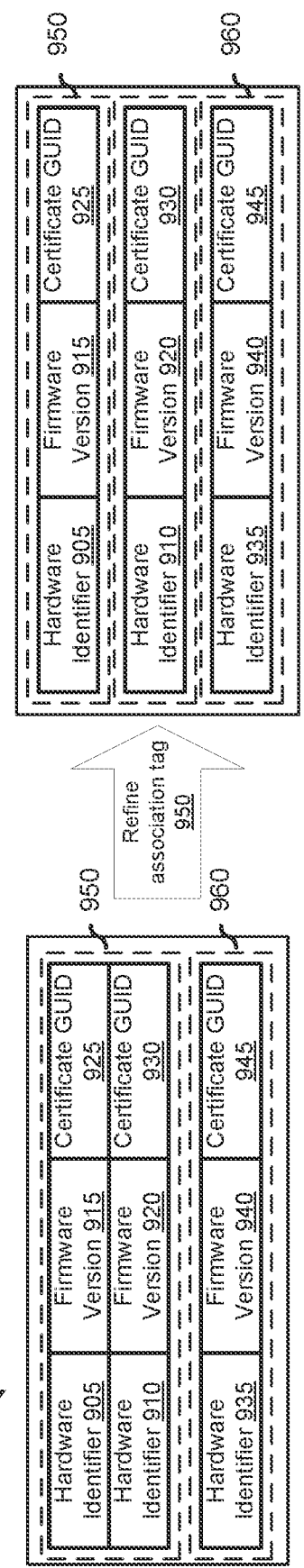
FIG. 9 is an association table that includes association information related to devices of an information handling system, according to an embodiment of the present disclosure.

FIG. 9 shows a diagram of an association table 900 that includes association information associated with devices of an information handling system. Association table 900 may be similar to association table 297 of FIG. 2. Association table 900 includes association tags 950 and 960. Association tag 950 may be classified as a group association tag because the association includes at least two hardware identifiers, firmware versions, and/or certificate GUIDs. In this example, association tag 950 maps hardware identifier 905, hardware identifier 910, firmware version 915, and firmware version 920 with certificate GUID 925 and certificate GUID 930. A refinement of the association tag may be performed by a secure boot service upon receipt of association tag 950, such that one hardware identifier and firmware version pair may be associated with one certificate GUID. Association tag 960 maps hardware identifier 935 and firmware version 940 with certificate GUID 945. Because association tag 960 includes one hardware identifier and firmware version pair that is mapped to certificate GUID 945, secure boot service may not perform a refinement of association tag 960.

Figure 10:
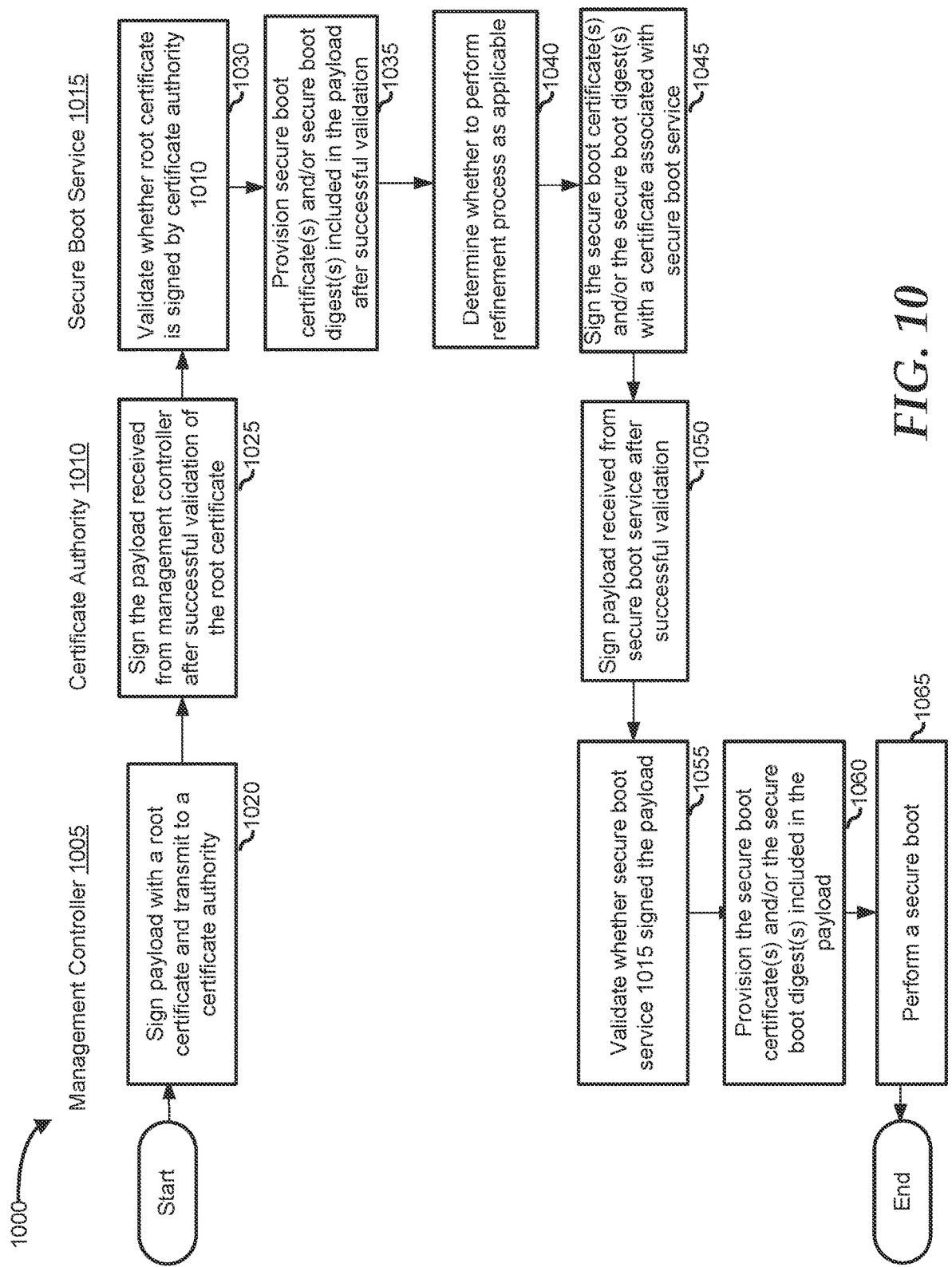
FIG. 10 is a flowchart illustrating a method for automatic provisioning of secure boot certificates, according to an embodiment of the present disclosure.

FIG. 10 shows a workflow 1000 for authenticity and integrity protection between a management controller and a secure boot service. Blocks in the workflow may be performed by a management controller 1005, a certificate authority 1010, and a secure boot service 1015. Management controller 1005 may be similar to management controller 310 of FIG. 3. Secure boot service 1015 may be similar to secure boot service 330 of FIG. 3. While embodiments of the present disclosure are described in terms of the aforementioned, it should be recognized that other components or systems may be utilized to perform the described workflow. One of skill in the art will appreciate that this flowchart explains a typical example, which can be extended to advanced applications or services in practice.

Workflow 1000 is typically performed when a new device is installed or reinstalled in an information handling system, firmware is updated, or a device similar to another device in another information handling system is installed or re-installed. Workflow 1000 typically starts at block 1020, where management controller 1005 may sign a payload with its root certificate and transmit the payload to certificate authority 1010. In particular, management controller 1005 may sign a secure boot certificate and/or a secure digest included in the payload. The root certificate used to sign the secure boot certificate and/or the secure digest may be a certificate of certificate authority 1010 that has been imported to a read-only data store at the factory during the manufacture of the information handling system and/or management controller 1005.

At block 1025, certificate authority 1010 may sign the payload received from management controller 1005 after a successful validation that the secure boot certificate and/or secure boot digest was signed by the root certificate of management controller 1005. Certificate authority 1010 may be a manufacturer of management controller 1005 or an information handling system that includes management controller 1005. Certificate authority 1010 may also be a private third-party vendor. In addition, certificate authority 1010 may be in a private cloud. After signing, certificate authority 1010 may transmit the secure boot certificate and/or secure boot digest to secure boot service 1015.

At block 1030, secure boot service 1015 may validate whether the certificate included in the payload received is signed by the root certificate of certificate authority 1010. Prior to block 1030, secure boot service 1015 may import a root certificate from certificate authority 1010. Upon successful validation of the root certificate, the workflow may proceed to block 1035. At block 1035, secure boot service 1015 may provision the secure boot certificate and/or the secure digest and/or perform a refinement process if applicable. Provisioning of the secure boot certificate and/or the secure boot digest includes updating a database of secure boot service 1015 with the secure boot certificate and/or the secure boot digest.

At block 1040, secure boot service 1015 may determine whether the payload can perform a refinement process. For example, if the payload includes a group association tag, then secure boot service 1015 may determine whether one of the hardware identifiers and associated software version is currently stored in the data store. If one of the hardware identifiers and associated software version is currently stored in the data store, then the group association tag may be split, wherein the hardware identifier and software version pair with the associated secure boot certificate is removed from the group association. Secure boot service 1015 may determine whether it could perform the refinement process on the remaining secure boot certificate(s) and/or secure boot digest(s) and perform the refinement process accordingly. This may be performed until a 1:1 association is left in the payload as applicable. Otherwise, the remaining secure boot certificate(s) and/or secure boot digest(s) in the group association tag may be stored in the data store. The refinement process may be performed until the secure boot cloud service determines that the refinement process cannot be performed.

At block 1045, secure boot service 1015 may sign the secure boot certificate(s) and/or secure boot digest(s) using a certificate associated with secure boot service 1015. Secure boot service 1015 may transmit the payload that includes the secure boot certificate(s) and/or secure boot digest(s) to certificate authority 1010 at block 1050.

At block 1050, certificate authority 1010 may sign the payload received from secure boot service 1015 after a successful validation that the payload was signed by secure boot service 1015. The successful validation may include a verification of the certificated used to sign the payload. The workflow may proceed to block 1055. At block 1055, management controller 1005 may validate whether secure boot service 1015 signed the payload received. The validation may include verification of the certificate used to sign the payload. The workflow may proceed to block 1060 upon successful verification. At block 1060, management controller 1005 may provision the secure boot certificate(s) and/or the secure boot digest(s) included in the payload. Provisioning may include updating the secure boot database with the received secure boot certificate(s) and/or secure boot digest(s). The workflow may proceed to block 1065 whereas management controller 1005 may proceed to perform a secure boot on the information handling system.

Figure 11:
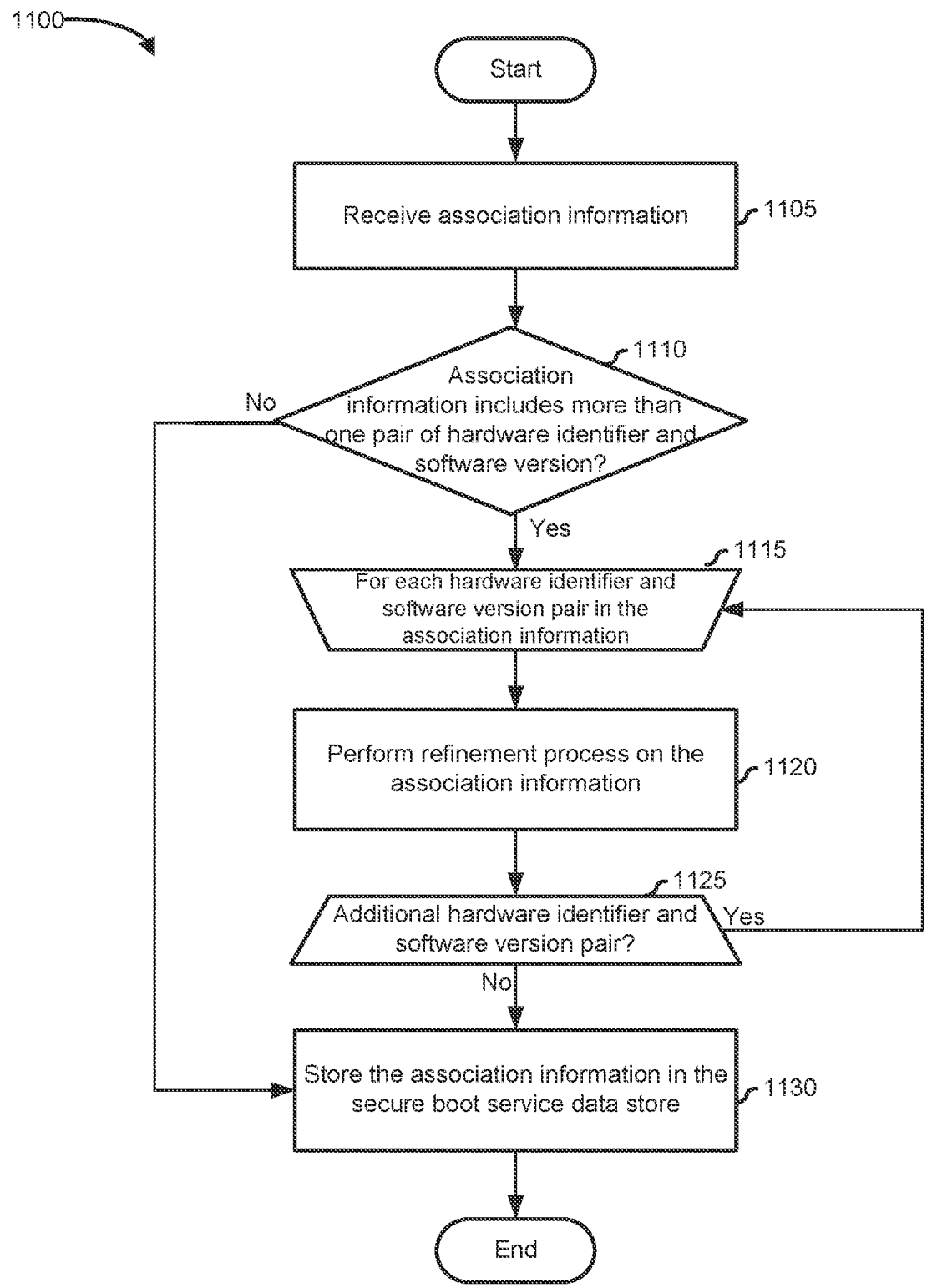
FIG. 11 is a flowchart illustrating a method for association refinement, according to an embodiment of the present disclosure.

FIG. 11 shows a flowchart of a method 1100 for association refinements. Method 1100 may be performed by one or more components of FIG. 3, such as secure boot service 330. However, while embodiments of the present disclosure are described in terms of environment 300 of FIG. 3, it should be recognized that other systems may be utilized to perform the described method. One of skill in the art will appreciate that this flowchart explains a typical example, which can be extended to advanced applications or services in practice.

Method 1100 typically starts at block 1105 where association information may be received from an information handling system. In particular, the association information may be received from a management controller or a runtime/ACPI application. The association information includes an association tag, such as association tag 950 or association tag 960 of FIG. 9. The method may proceed to decision block 1110 where it determines whether the association information received includes more than one hardware identifier and software version pair. If the association information includes more than one hardware identifier, then the method may proceed to block 1115. If the association information does not include more than one hardware identifier and software version pair, then the method may end.

At block 1115, the method may start a loop associated with each hardware identifier and software version pair in the association information. The method may proceed to block 1120 where it may perform a refinement process on the association information. The refinement process may be performed to split the associations with at least one 1:1 association, wherein one secure boot certificate and/or secure digest are associated with one hardware identifier software version pair. For example, if there are two hardware identifiers and software versions included in the association information, such as in association tag 950 of FIG. 9, then the refinement process may be performed until the pairs have been processed. After performing the refinement process, the method proceeds to block 1125 where it may determine whether there is an additional hardware identifier and software version pair to be processed. If there is an additional hardware identifier and software version pair to be processed, then the method may proceed to block 1115. If there is no additional hardware identifier to be processed, then the proceeds to block 1130, where the method may store the association information in the secure boot service data store. After which, the method ends.

Figure 12:
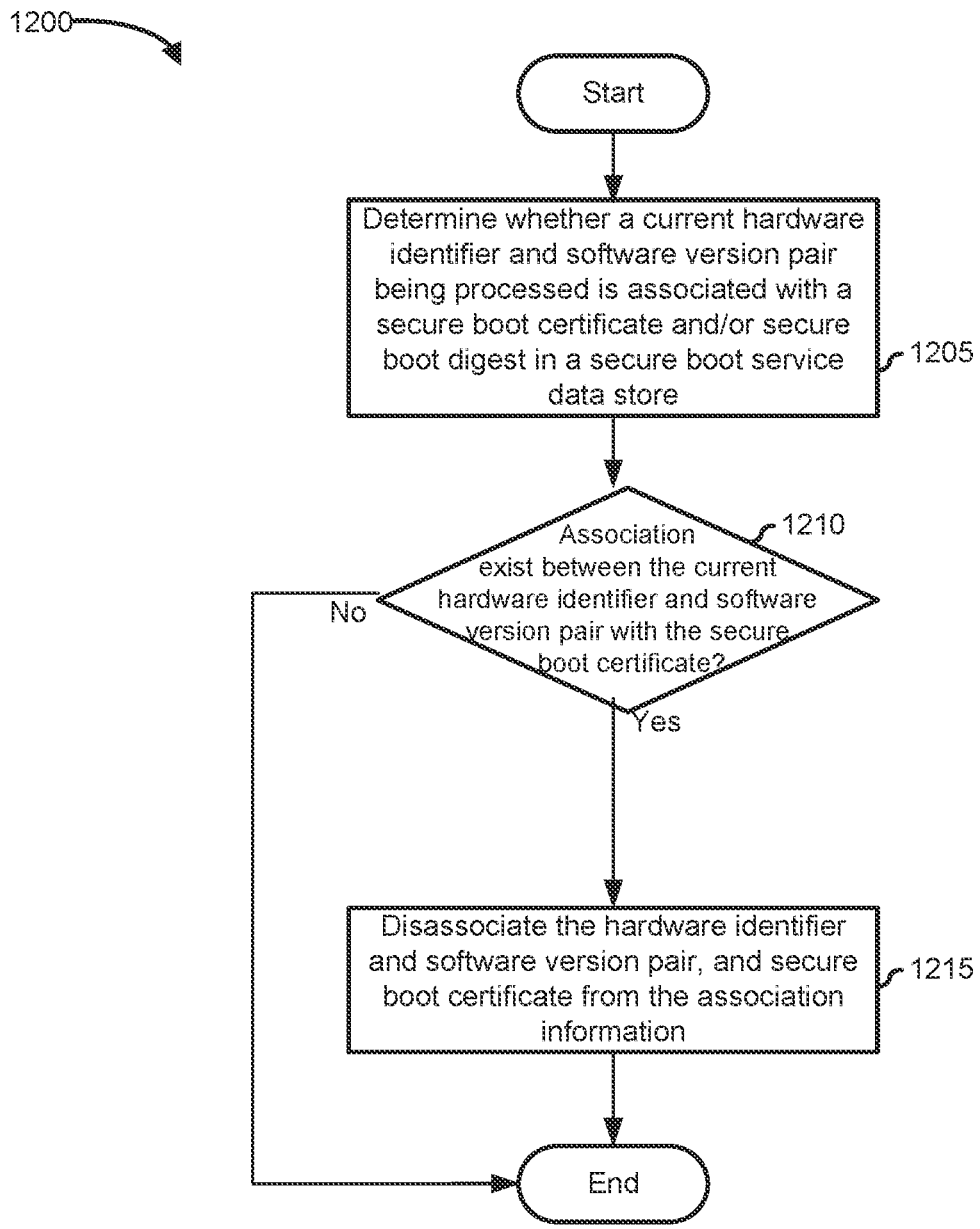
FIG. 12 is a flowchart illustrating a method for association refinement, according to an embodiment of the present disclosure.

FIG. 12 shows a flowchart of a method 1200 for association refinements. In particular, method 1200 depicts block 1120 of FIG. 11 in more detail. Method 1200 may be performed by one or more components of FIG. 3, such as secure boot service 330. However, while embodiments of the present disclosure are described in terms of environment 300 of FIG. 3, it should be recognized that other systems may be utilized to perform the described method. One of skill in the art will appreciate that this flowchart explains a typical example, which can be extended to advanced applications or services in practice.

Method 1200 typically starts at block 1205 where it determines whether a hardware identifier and software version pair is associated with a secure boot certificate in a secure boot service data store. For example, the method may query the secure boot service data store to determine if there is association information with the same hardware identifier and software version pair that is associated with one of the secure boot certificates and/or secure boot digests in the association information received. The method proceeds to decision block 1210 where it determines whether an association exists between the hardware identifier and software version with a secure boot certificate in the secure boot service database. If an association exists, then the method proceeds to block 1215. If an association does not exist, the method ends.

At block 1215, the method may refine the association information by splitting the data in the association information received based on the hardware identifier and software version pair currently being processed, also referred to as the current hardware identifier and software version pair. In particular, the hardware identifier, the software version, and the secure boot certificate associated with the hardware identifier based on the response to the query in block 1205, may be split or disassociated from the association tag in the association information. For example, as shown in FIG. 3, association tag 950 includes a hardware identifier 905, hardware identifier 910, firmware version 915, and firmware version 920 that are mapped to certificate GUID 925 and certificate GUID 930. In this example, the pair of hardware identifier 905 and firmware version 915 is currently associated or mapped to certificate GUID 925 in the secure boot service data store. Accordingly, hardware identifier 905, firmware version 915, and certificate GUID 925 may be split or removed from association tag 950. As such, association tag 950 now includes a pair of hardware identifier 910 and firmware version 920 that is mapped to certificate GUID 930. This refined association information with the updated association tag 950 may be stored in the secure boot service data store.

As used herein, a hyphenated form of a reference numeral refers to a specific instance of an element and the un-hyphenated form of the reference numeral refers to the collective or generic element. Thus, for example, hardware "265-1" refers to an instance of a hardware class, which may be referred to collectively as hardware "265" and any one of which may be referred to generically as a hardware "265."

Although FIG. 5, FIG. 6, and FIG. 7, show example steps of sequence 500, sequence 600, and sequence 700 in some implementations, sequence 500, sequence 600, and sequence 700 may include additional steps, fewer steps, different steps, or differently arranged steps than those depicted in FIG. 5, FIG. 6, and FIG. 7. Those skilled in the art will understand that the principles presented herein may be implemented in any suitably arranged processing system. Additionally, or alternatively, two or more of the steps of sequence 500, sequence 600, and sequence 700 may be performed in parallel. For example, step 560 and step 565 of sequence 500 may be performed in parallel.

Although FIG. 10, FIG. 11, and FIG. 12 show example blocks in workflow 1000, method 1100, and method 1200 in some implementations, workflow 1000, method 1100, and method 1200 may include additional blocks, fewer blocks, different blocks, or differently arranged blocks than those depicted in FIG. 10, FIG. 11, and FIG. 12. Those skilled in the art will understand that the principles presented herein may be implemented in any suitably arranged processing system. Additionally, or alternatively, two or more of the blocks of workflow 1000, method 1100, and method 1200 may be performed in parallel. For example, block 1060 and block 1065 of workflow 1000 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an ASIC, an FPGA, a structured ASIC, or a device embedded in a larger chip), a card (such as a PCI card, a PCI-express card, a PCMCIA card, or other such expansion card), or a system (such as a motherboard, an SoC, or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
    detecting, by a processor, installation of a hardware device that includes software;
    associating a hardware identifier of the hardware device and a software version of the software to a secure boot certificate;
    generating an association tag based on the associating of the hardware identifier and the software version;
    provisioning the secure boot certificate; and
    publishing the association tag to a remote service.

2. The method of claim 1, wherein the association tag represents an association of the hardware identifier and the software version with the secure boot certificate.

3. The method of claim 1, further comprising storing the association tag in a data store.

4. The method of claim 1, further comprising generating a secure digest based on the software.

5. The method of claim 1, wherein the secure boot certificate is signed by the remote service subsequent to successful validation.

6. The method of claim 1, further comprising in response to detecting a second installation of a second hardware device, querying the remote service for the secure boot certificate associated with a second hardware identifier that is associated with the second hardware device, wherein the second hardware device is of same hardware type as the hardware device.

7. The method of claim 1, further comprising determining the hardware identifier and the software version.

8. The method of claim 1, further comprising performing a secure boot subsequent to provisioning the secure boot certificate.

9. The method of claim 1, further comprising performing a hardware inventory to determine the hardware identifier of the hardware device.

10. The method of claim 1, further comprising a software inventory to determine the software version of the software.

11. An information handling system, comprising:
a processor; and
a memory storing instructions that when executed cause the processor to perform operations including:
detecting installation of a hardware device that includes software;
transmitting a request for a secure boot certificate associated with a hardware identifier of the hardware device and a software version of the software; and
subsequent to receiving the secure boot certificate associated with the hardware identifier and the software version, provisioning the secure boot certificate.

12. The information handling system of claim 11, wherein the operations further comprise generating an association tag that includes an association of the hardware identifier and the software version with the secure boot certificate.

13. The information handling system of claim 12, wherein the operations further comprise storing the association tag in a data store.

14. The information handling system of claim 11, the operations further comprise performing a secure boot subsequent to the receiving of the secure boot certificate.

15. The information handling system of claim 11, the operations further comprise performing a hardware inventory to determine the hardware identifier.

16. The information handling system of claim 11, the operations further comprise performing a software inventory to determine the software version.

17. A non-transitory computer-readable medium to store instructions that are executable to perform operations comprising:
receiving association information that includes a plurality of hardware identifier and software version pairs that are mapped to a plurality of secure boot certificates;
for each pair of a hardware identifier and a software version of the hardware identifier and software version pairs included in the association information, determining whether a pair of the hardware identifier and the software version is associated with a secure boot certificate currently stored in a remote data store, wherein the secure boot certificate is one of the secure boot certificates included in the association information; and
in response to determining that the pair of the hardware identifier and the software version is associated with the secure boot certificate, disassociating the pair of the hardware identifier and the software version along with the secure boot certificate from the association information.

18. The non-transitory computer-readable medium of claim 17, wherein the operations further comprise in response to determining that there is no secure boot certificate in the remote data store that is associated with the pair of hardware identifier and software version, storing the association information in the remote data store.

19. The non-transitory computer-readable medium of claim 17, wherein the operations further comprise determining whether the association information includes more than one pair of the hardware identifier and the software version.

20. The non-transitory computer-readable medium of claim 17, wherein the operations further comprise in response to determining that the association information includes one pair of the hardware identifier and the software version, storing the association information in the remote data store.

* * * * *